United States Patent

[11] 3,609,016

[72] Inventor Arthur Jampolsky
 Mill Valley, Calif.
[21] Appl. No. 888,123
[22] Filed Dec. 30, 1969
[45] Patented Sept. 28, 1971
[73] Assignee Optical Sciences Group Incorporated
 San Francisco, Calif.
 Continuation of application Ser. No.
 699,896, Jan. 23, 1968.

[54] VISION-TESTING DEVICE FOR VISUALLY
 DISPLAYING A CALIBRATED SIGNAL TO THE
 EYE AND RECORDING THE RESPONSIVE
 MOVEMENT THERETO
 6 Claims, 6 Drawing Figs.
[52] U.S. Cl. .................................................. 351/7,
 350/145, 351/39
[51] Int. Cl. ..................................................... A61b 3/14,
 G02b 27/02
[50] Field of Search........................................... 351/1, 7,
 39; 350/145, 174, 296, 298

[56] References Cited
UNITED STATES PATENTS
3,205,303  9/1965  Bradley .................. 350/296 UX
*Primary Examiner*—David Schonberg
*Assistant Examiner*—Paul A. Sacher
*Attorney*—Boyken, Mohler, Foster & Schwab ABSTRACT: A vision-testing device in the form of a frame which is placed in contact with and supported by the head of the subject to allow the subject freedom of head movement during examination. The frame carries a pair of signal display elements plus optical path modifiers, one for each eye, for forming, displaying and directing a separate display stimulus toward each eye without interfering with the normal vision. The frame further carries a set of flexible light pipes whose objectives are positioned to image the eyes upon a photographic recording means without interfering with the normal vision of the subject along with a record of the stimulus which is being directed to the eyes. Finally, the frame carries a point source of light which is positioned forward of and in a plane bisecting the eyes to provide corneal reflections from both eyes.

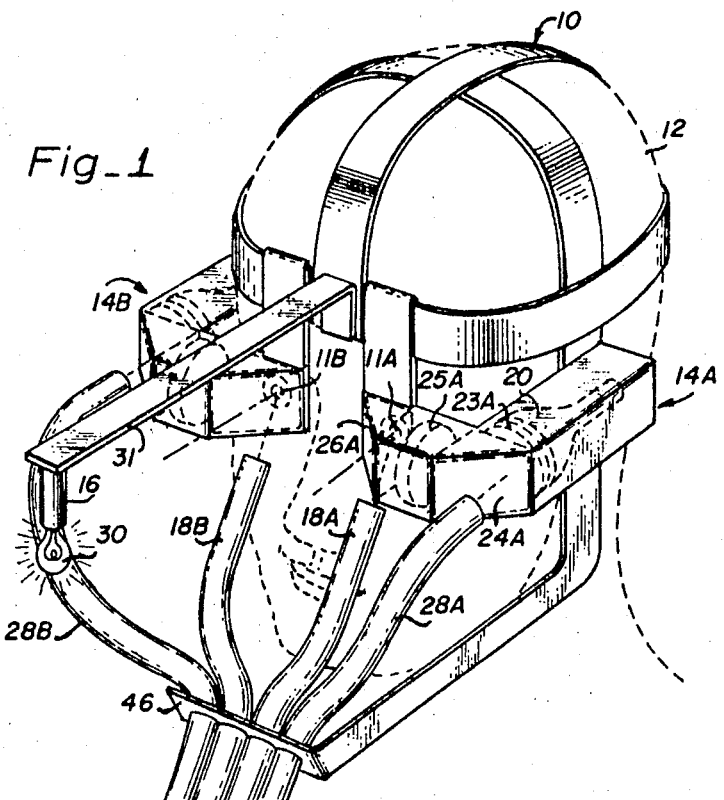
Fig_1
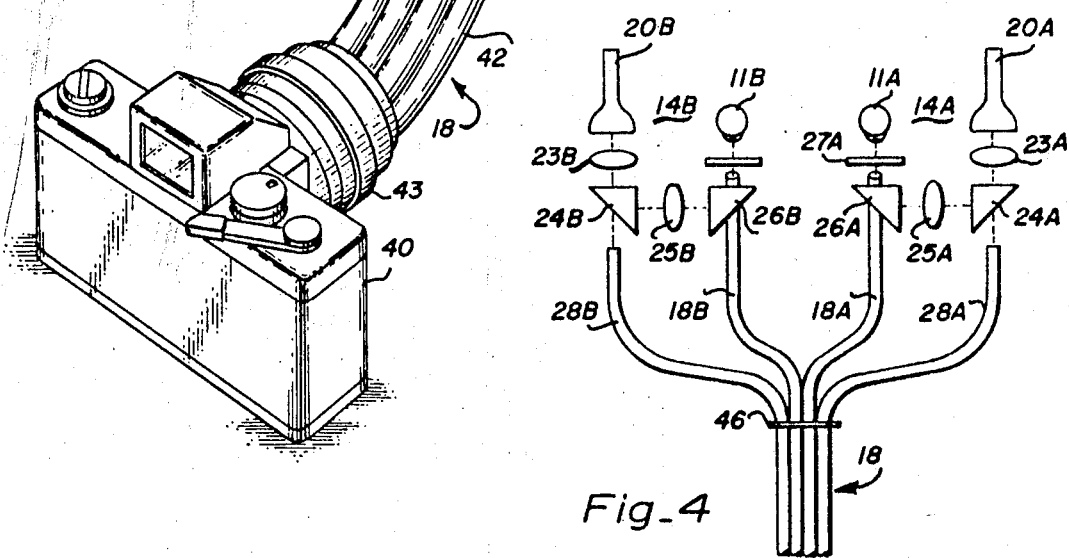
Fig_4
INVENTOR
ARTHUR JAMPOLSKY
BY
ATTORNEY

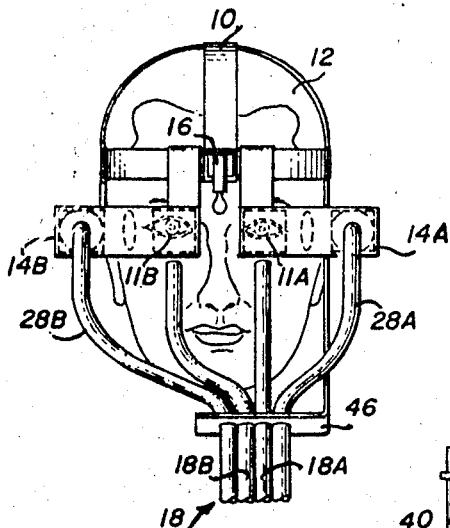
Fig_2
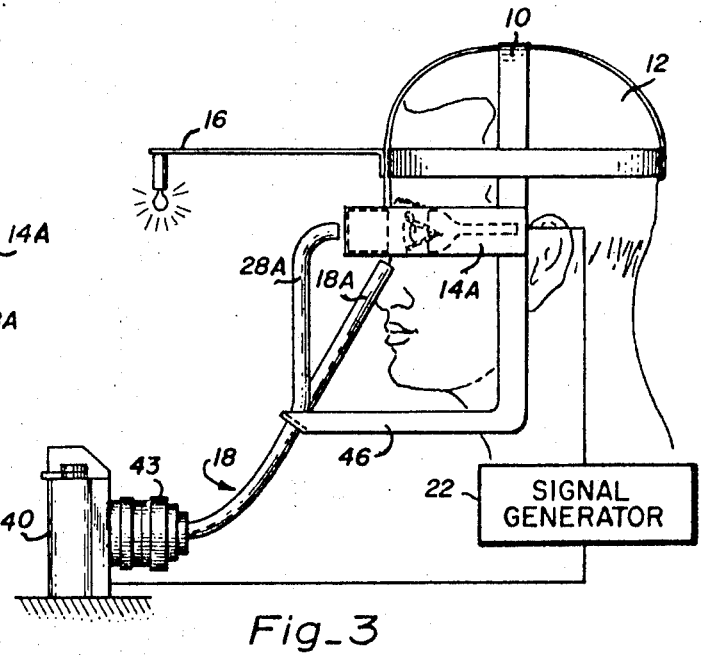
Fig_3
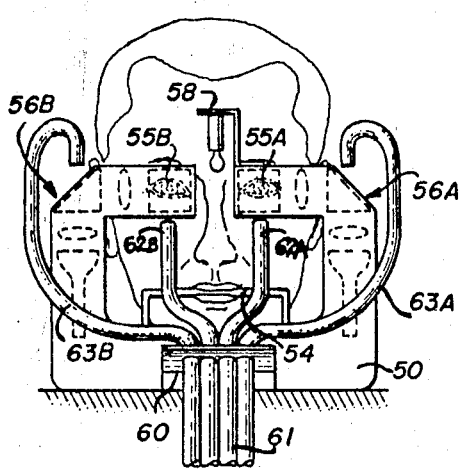
Fig_5
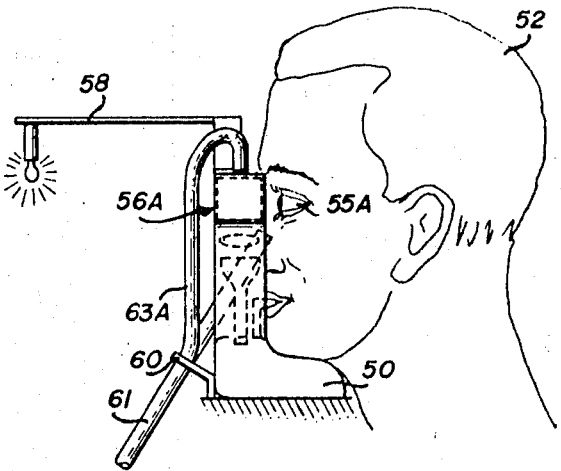
Fig_6

VISION-TESTING DEVICE FOR VISUALLY DISPLAYING A CALIBRATED SIGNAL TO THE EYE AND RECORDING THE RESPONSIVE MOVEMENT THERETO

This is a continuation of application Ser. No. 699,896 filed Jan. 23, 1968, the priority date of which is claimed.

BACKGROUND OF THE INVENTION

1. Field of the Invention

This invention relates to a device for determining the sensory and motor response characteristics of the visual apparatus without requiring any oral or auditory communication with an examining person, and, more particularly, to a device which presents a calibrated signal in the form of a display (stimulus) to the eyes and which records the stimulus and the movement made by the eye in response thereto for subsequent analysis.

2. Description of the Prior Art

There is a general consensus among the medical fraternity that eye movements may be employed as end points for determining the sensory and motor aspects of the visual system. This principle is beginning to find wide application, and is now primarily made use of by stimulating the eye or eyes in some manner and evaluating the eye response to such a stimulus.

The earliest method of conducting such a test was to stimulate the eye of the subject in some predetermined manner, and thereafter ask the subject being tested as to what he saw or observed. Necessarily, the subject's reaction was subject to inaccuracies as to what he did perceive and, in many instances, did eliminate any reported reaction when the subject was not aware of having reacted. To overcome the unreliability of these subjective reports of eye movement, a number of objective tests have been proposed in which responsive eye motion is recorded by utilizing light reflected from the iris-scleral area of the eye. In one recording system developed for this purpose, the line filament of a lamp is imaged on the eyes of the subject so that lateral motion of the eye is detected by the change in the relative amount of light reflected from the eye as the line image progresses or recedes across the iris-scleral boundary. In another recording system developed for this purpose, the point filament of a lamp is imaged on the eyes of the subject to provide corneal reflection from which any eye motion of the subject is easily determined by measuring the position of the point image.

While such recording of responsive eye motion did overcome some of the problems caused by the subjective reporting, the use of such recording techniques was limited for a number of reasons. For meaningful results it was necessary to clamp the head so that its position with respect to the stationary source provided an image for corneal reflection. Further, the lack of normal head mobility produced an artificial environment which was objectionable for obvious reasons. Also, there was a general lack of a suitable signal display means which allowed stimulating the subject's eyes with a calibrated display signal which would not interfere with the subject's normal vision and normal mobility. No device has ever been developed, as far as I am aware of, which allowed subjecting the eyes to a calibrated signal or series of signals and simultaneously recording eye response while the subject was in a position to carry out his normal visual functions, and which utilizes corneal reflections without attaching any devices to the eyeball.

It is therefore a primary object of the present invention to provide a device for measuring certain diagnostically significant characteristics of a person's visual system which device may be operated while the person may be carrying on his usual visual functions. The device is desired to provide a series of calibrated signals in the form of visual displays to either or both eyes, individually or simultaneously, without interfering with the subject's visual functions. The device further is desired to sense the movement of each eye in response to the calibrated signals being directed to either or both eyes and to produce a photographic record of the movements and their amounts and the stimuli for a subsequent work-up.

It is another object of the present invention to provide a new and novel device for subjecting the eye to a calibrated signal and for recording eye movement in response to the signal.

It is further object of the present invention to provide an improved means which allow the uninterfered recording of the eye response while the eye is subjected to a known stimulus, or the uninterfered stimulating of the eye by a known stimulus while the eye response is recorded.

It is another object of the present invention to provide an eye movement response recording system that provides a permanent record of both the quantitative and qualitative movement of the eye and the stimulus producing the eye movement.

It is another object of the present invention to provide a means for simultaneously subjecting both eyes to stimuli and making a permanent record of eye response from which both sensory and motor aspects of the sensory apparatus may be determined.

It is still another object of the present invention to provide an improved means of presenting to the eye a variety of visual signals and recording the resultant eye motion.

It is also an object of the present invention to provide an apparatus which may be utilized by untrained personnel to test, detect and diagnose visual disorders of subjects with whom the examiner cannot converse such as very young children or adults with language barriers, as well as allow the investigation of subjects engaged in other tasks which require their undivided attention.

SUMMARY OF THE INVENTION

In accordance with the present invention, there is provided a basic frame member which is rigidly mountable with respect to the head of a person. In the preferred embodiment of this invention, the frame member is in the form of a head helmet or band so that it can move with the head of the person. If head mobility is not important, the frame member may be ground supported and have a bit bar for bite engagement by the subject.

Attached to the frame member and movable therewith are the three essential components of the device. One component is the signal display means which presents calibrated signals in the form of visual displays to the eyes. One form of such a component comprises a pair of miniaturized cathode ray display tubes attached to opposite sides of the frame member and having their image beams directed through a suitable optical path system towards the eyes without interfering with the normal visual function. The display tubes are connected to a suitable signal source or function generator which develops the calibrated visual signal.

Another component of the device is the eye movement recorder which records eye motion and the calibrated signal. One form of recorder comprises wide angle objectives attached to flexible light pipes and disposed for viewing the eyes and the calibrated signal. The images are projected by the light pipes on a photographic recording device through a shutter mechanism. The wide angle objectives are positioned in such a manner that the subject's normal visual function is unobstructed.

Further objects and advantages of the present invention will become apparent to those skilled in the art to which the invention pertains as the ensuring description proceeds.

The features of novelty that are considered characteristic of this invention are set forth with particularity in the appended claims. The organization and method of operation of the invention itself will best be understood from the following description when read in connection with the accompanying drawings in which:

BRIEF DESCRIPTION OF THE DRAWINGS

FIG. 1 is a perspective view of the vision-testing devices of this invention utilizing a head band type frame;

FIG. 2 is a front view of the device shown in FIG. 1;

FIG. 3 is a side view of the device shown in FIG. 1;

FIG. 4 is a schematic top view of the display means and the optical fiber bundles;

FIG. 5 is an alternate embodiment of the vision-testing device of this invention utilizing a bite bar type frame; and FIG. 6 is a side view of the device shown in FIG. 5.

DESCRIPTION OF THE PREFERRED EMBODIMENT

Referring now to FIGS. 1–4 of the drawings, in which like reference characters designate like parts, there is shown a frame member 10 in the form of a head band which is in place upon the head 12 of a subject shown in dotted outline. Affixed to frame member 10 are a pair of signal display means 14A and 14B for presenting calibrated signals to eyes 11A and 11B of the subject, respectively, a point source of light 16 for providing corneal reflections, and an eye movement recorder 18 for recording the position of eyes 11A and 11B and the calibrated signals for display means 14A and 14B.

Signal display means 14A and 14B may be alike in all respects so that only one need be described herein in detail. Basically, display means 14A and 14B are constructed to provide calibrated signals to the eyes, the signals forming known eye stimuli. There are many types of displays which can be used with the present invention; however, the display should preferably be independent of head position, and should allow the subject his normal visual functions. In other words, the signal should be superimposed on the normal vision. This is best accomplished by fixing the display to frame member 10 as shown.

As best seen in FIG. 4, display means 14A comprises a means for forming the calibrated signal, such as a cathode ray display tube (CRT) 20A connected to a suitable function generator 22. Disposed between the front face of CRT 20A and eye 11A is an optical path system having at least its ocular portion immovably affixed to frame member 10. The illustrated optical path system includes, in the order stated, an objective lens 23A directly in front of CRT 20A, a half-silvered prism 24A, an ocular lens 25A, another half-silvered prism 26A and an optical element holder 27A. Half-silvered prisms 24A and 26A each perform important functions; prism 24A permits half of the display to pass straight through the prism for interception by fiber optics bundle 28A, and the other half of the display is reflected at a 90° angle for interception by prism 26A which reflects the display through another 90° towards eye 11A. The reason that prism 26A is half silvered is that it permits eye 11A its normal visual function. Optical element holder 27A is provided so that different optical elements may be interposed between eye 11A and the optical system.

The calibrated display signals are displayed on the front faces of CRT tubes 20A and 20B and may or may not be alike, depending on the particular test or investigation to be conducted. Since signal display means 14A and 14B, or at least their ocular portions, are rigidly mounted to head band 10, the displays move with the head, and the subject wearing the head band is not restricted in any manner when being tested in excercising his normal visual function.

Light source 16 is formed by the point source filament of a lamp 30 which is affixed to a forwardly extending bracket 31 attached to frame member 10 which positions the lamp midway between the subject's eyes. The light from lamp 30 passes either through or above prism 26A directly into eyes 11A, and through corresponding prism 26B of stimulator 14B into eyes 11B to provide corneal reflection as a standard from which any quantitative displacement of the cornea may be measured.

Eye movement recorder 18 is basically a photographic recording device 40, such as a camera, having a light shutter between the objective lens and the photographic film and an optical system 42 disposed between the objective lens 43 of the camera, the subject's eyes, and the signal display means. Optical system 42 comprises four coherent optic fiber bundles 18A, 18B, 28A and 28B each having a suitable lens disposed across the end faces of the fiber bundles facing the object to be recorded and for displaying the image of the object upon the end faces of the fiber bundles facing camera lens 43 for recording. More particularly, the objective end portions of fiber optics bundles 18A and 18B are focused directly on eyes 11A and 11B, respectively, and look at the eye from below to avoid interfering with the subject's normal visual function as best seen in FIG. 3. The object end portions of fiber optics bundles 28A and 28B are directed, through prisms 24A and 24B respectively, for viewing the faces of CRT 20A and 20B for providing a record of the calibrated displays used as stimuli.

It should be noted that at least the objective portion of the optical system of eye movement recorder 18 is rigidly attached to frame member 10, such as by means of clamps 46, so that it moves with frame 10. Film advance and shutter actuation control means are provided by function generator 22 to which the camera is connected. While recording device 40 has been illustrated as a camera, it is to be understood that normally a slit type shutter is preferred to provide a strip picture. These types of camera are well known and form no part of the invention.

Referring now to FIGS. 5 and 6, there is illustrated an alternate embodiment of the present invention in which a generally table supported frame member 50 is engaged by a subject 52 which bites on a bite bar 54. Except for the difference in frame member configuration, the device shown in FIGS. 5 and 6 is similar in all major respects to the one described in connection with FIGS. 1–4. For example, table-supported frame member 50 carries a signal display means 56A for the subject's eye 55A and a similar signal display means 56B for the subject's eye 55B. Both display means 56A and 56B have at least the image-presenting structure mounted upon, or affixed to, frame member 50. Frame member 50 also carries a point source 58 for corneal reflection and has affixed to it, by means of a bracket 60, the objective portion of an optical system 61 of an eye response recorder (not shown), comprising a bundle 62A for eye 55A, a bundle 62B for eye 55B, a bundle 63A for display means 56A, and a bundle 63B for display means 56B.

In operation of the present invention the left and right CRT's are provided with suitable electrical signals which generate the calibrated signals or series of signals upon the face of the display tubes which are then superimposed upon the subject's normal vision for stimulating the eyes. At the same time the eye movement recorder is activated by a suitable shutter control signal, and a photographic record is made of the instantaneous position of each eye as revealed by the corneal reflection, plus a record of the signal presented to the eye. Investigations of the visual apparatus can then be made from the recorded eye response and the correlated display stimulus.

There has been described hereinabove a device which presents to each eye a sequence of calibrated display signals and records the movement and its amount of each of the eyes when so stimulated, along with a record of the calibrated signal, which has been found very valuable for testing, diagnosing and investigating the human visual system and which accomplishes this by measuring corneal reflections. By utilization of a headband, and mounting a point source directly to the band, free head motion is permissible, and eye movement is simply determined by displacement of the corneal reflection. The photographic recording technique provides objective data for subsequent analysis.

What is claimed is:

1. The method of diagnosing ocular disorders including the steps of:

a. reflecting light from a fixed source from the cornea of an open eye:

b. interposing predetmined and differentiated stimuli in the field of gaze of said open eye without materially interrupting the vision therein;

c. separately objectively recording the reaction of said open eye to each different stimulus by recording reflected light from said cornea at the time of interposing each different stimulus in said field of gaze;

d. substantially simultaneously recording each different stimulus as well as the reaction of said open eye for diagnostic purposes.

2. A vision tester for diagnosing ocular disorders comprising:
   a. a source of light to be reflected from the cornea of an open eye;
   b. frame means for fixing said source of light with respect to said cornea;
   c. display means for interposing predetermined and differentiated stimuli within the field of gaze of said open eye without materially interrupting the vision therein;
   d. recording means for objectively recording each reaction of said open eye to each different stimulus by recording reflected light from said cornea at the time of interposing each stimulus in said field of gaze, said recording means having a fixed relation to said cornea and said source of light.
   e. said recording means and said display means are operatively interconnected to record each stimulus displayed and the reaction of the eye thereto simultaneously.

3. The vision tester defined in claim 2, in which:
   e. said display means includes a calibrated stimuli generator and an optical system adapted to interpose each stimulus generated into the field of gaze of said open eye.

4. The vision tester defined in claim 2, in which:
   e. said recording means includes a light-gathering system so positioned with respect to said cornea as to collect light reflected therefrom without interfering with the normal vision in said eye.

5. The vision tester defined in claim 3, in which:
   f. said stimuli generator and said recording means are operatively interconnected whereby each stimulus generated and said open eye's reaction thereto are objectively recorded simultaneously.

6. The vision tester defined in claim 3, in which:
   f. said stimuli generator is capable of generating a plurality of predetermined, differentiated stimuli each of which elicits a different reaction from said open eye.